Patented Jan. 3, 1933

1,892,970

UNITED STATES PATENT OFFICE

CURT SCHUMANN, REINHOLD FICK, AND ERWIN OBERREIT, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PRODUCTION OF CYANIDES OF CALCIUM

No Drawing. Application filed May 14, 1928, Serial No. 277,788, and in Germany May 20, 1927.

We have found that compounds of calcium containing more than 50 per cent of calcium cyanide which are stable and free from brown polymerization products are obtained by acting on calcium oxid or hydroxid or mixtures thereof with a stream of gaseous hydrocyanic acid mixed with so much of a gas, not saturated with water vapor and not reacting with the initial materials, at ordinary or slightly elevated temperature, that most or all of the water formed during the reaction is carried away by the said gas in the vapor state. Preferably the reaction is carried out with gases which are freed to a large extent say to about 50 per cent or more from water vapor, for instance by cooling the gases to low temperatures. Such cooling is a very efficient method as results from the fact that for example ammonia or nitrogen saturated at ordinary temperature with water vapor, are freed from a considerable portion of their water content by cooling to about 5° C. so that the said gases are saturated only to 25 and 30% respectively with water vapor when subsequently warmed to about 25° C. As gases which may be used for the said purpose nitrogen, hydrogen, air, illuminating gas, methane and the like may be used. Mixtures of hydrocyanic acid gas with an equal volume of additional gas to about thirty times and more of the latter may be employed, the precise proportions depending on the temperature employed, which generally speaking does not exceed 100° C. Gaseous ammonia may also be used as additional gas which, however, must be employed in rather large quantities as it reacts with the calcium cyanide formed, yielding calcium cyanide diammoniate which is thus produced in a very simple manner and may be used as such or decomposed by heating it, in vacuo, if desired, into calcium cyanide and ammonia.

The following examples will further illustrate the nature of the said invention which however is not limited thereto.

Example 1

Hydrocyanic acid gas mixed with five times its volume of dry nitrogen is passed at 20° C. over a thin layer of calcium hydroxid. A nearly colorless product containing more than 50 per cent of calcium cyanide is obtained. For improving the stability of the product the last traces of moisture may be removed by passing a stream of dry inert gas over it, or by warming in vacuo.

Example 2

A wet gaseous mixture of ammonia with about 5 per cent of hydrocyanic acid is cooled for lowering its water content to about 5° C., the water separated is drawn off and the mixture is then passed over finely divided calcium hydroxid at about 25° C. A white reaction product containing about 90 per cent of ammonia-calcium cyanide is obtained.

What we claim is:—

1. The process which comprises passing a gaseous mixture of hydrocyanic acid and so much of a gas capable of taking up substantial amounts of water vapor and not reacting with the initial materials over a compound of calcium selected from the group of its oxid and hydroxid at a temperature not exceeding 100° C. that the water of reaction is carried away with the gas added.

2. The process which comprises passing a gaseous mixture of hydrocyanic acid and several times its volume of a gas capable of taking up substantial amounts of water vapor and not reacting with the initial materials over calcium hydroxid at a temperature not exceeding 100° C. so that the water of reaction is carried away with the gas added.

3. A process for producing calcium cyanide diammoniate which comprises passing a gaseous mixture of hydrocyanic acid and so much of ammonia capable of taking up substantial amounts of water vapor over calcium hydroxid at a temperature not exceeding 100° C. that the water of reaction is carried away with the ammonia.

4. A process for producing calcium cyanide diammoniate which comprises passing a mixture of hydrocyanic acid gas and at least ten times its volume of ammonia saturated to at the most 50 per cent with water vapor over calcium hydroxid at ordinary temperature.

In testimony whereof we have hereunto set our hands.

CURT SCHUMANN.
REINHOLD FICK.
ERWIN OBERREIT.